United States Patent
Tredoux et al.

(10) Patent No.: US 10,522,304 B2
(45) Date of Patent: Dec. 31, 2019

(54) SPRING OPERATED ACTUATOR FOR AN ELECTRIC APPARATUS

(71) Applicant: ABB Schweiz AG, Baden (CH)

(72) Inventors: Johannes Tredoux, Ludvika (SE); Daniel Staffas, Ludvika (SE); Randee-Chao Chen, Beijing (CN)

(73) Assignee: ABB Schweiz AG, Baden (CH)

( * ) Notice: Subject to any disclaimer, the term of this patent is extended or adjusted under 35 U.S.C. 154(b) by 1 day.

(21) Appl. No.: 16/070,620

(22) PCT Filed: Jan. 19, 2017

(86) PCT No.: PCT/EP2017/051098
§ 371 (c)(1),
(2) Date: Jul. 17, 2018

(87) PCT Pub. No.: WO2017/140457
PCT Pub. Date: Aug. 24, 2017

(65) Prior Publication Data
US 2019/0348231 A1    Nov. 14, 2019

(30) Foreign Application Priority Data
Feb. 16, 2016 (EP) .................................. 16155837

(51) Int. Cl.
*H01H 13/06* (2006.01)
*H01H 3/60* (2006.01)
(Continued)

(52) U.S. Cl.
CPC .............. *H01H 3/605* (2013.01); *F03G 1/02* (2013.01); *F16F 3/04* (2013.01); *F16F 9/02* (2013.01);
(Continued)

(58) Field of Classification Search
CPC .... H01H 13/06; H01H 9/04; H01H 2009/048; H01H 2223/002; H01H 21/08;
(Continued)

(56) References Cited

U.S. PATENT DOCUMENTS

| | | |
|---|---|---|
| 4,678,877 A | 7/1987 | Nicoloso |
| 5,280,258 A | 1/1994 | Opperthauser |

(Continued)

FOREIGN PATENT DOCUMENTS

| | | |
|---|---|---|
| CN | 102656651 A | 9/2012 |
| CN | 103388360 A | 11/2013 |
| EP | 2317530 A1 | 5/2011 |

OTHER PUBLICATIONS

The People's Republic of China Office Action and Translation Application No. 2017800116620 Completed: Jun. 19, 2019 9 pages.
(Continued)

*Primary Examiner* — Ahmed M Saeed
(74) *Attorney, Agent, or Firm* — Whitmyer IP Group LLC

(57) ABSTRACT

A spring operated actuator for an electric switching apparatus including an actuator spring and a rotary air damper. The damper has components that are rotatable relative to each other and is arranged to decelerate the actuating movement during an end portion. The damper has a toroidal working chamber with internal wall surfaces formed by two circumferential housing parts. They are rotatable relative to each other and are meeting each other such that a first and a second gap are formed. There is a seal between the two housing parts, which bridges the respective gap. The seal has a first circumferential seal at the first gap and a second circumferential seal at the second gap. At least one of the first and second seals includes a sealing body fitted in a groove formed in the internal walls of at least one housing part.

19 Claims, 13 Drawing Sheets

(51) Int. Cl.
  *H01H 9/02* (2006.01)
  *H01H 3/30* (2006.01)
  *F03G 1/02* (2006.01)
  *F16F 9/02* (2006.01)
  *F16F 3/04* (2006.01)
  *F16F 13/00* (2006.01)
  *F16F 9/12* (2006.01)

(52) U.S. Cl.
  CPC .............. *F16F 9/12* (2013.01); *F16F 13/007* (2013.01); *H01H 3/3042* (2013.01); *H01H 9/02* (2013.01); *F03G 2730/02* (2013.01); *F03G 2730/03* (2013.01); *F16F 2222/126* (2013.01); *F16F 2232/02* (2013.01); *H01H 3/3026* (2013.01)

(58) Field of Classification Search
  CPC .............. H01H 19/06; H01H 2223/044; H01H 13/063; H01H 23/06; H01H 3/605; H01H 9/02; H01H 3/3042; H01H 3/3026; H01H 13/04; H01H 71/0207; H01H 71/02; H01H 71/0214; F03G 1/02; F03G 2730/02; F03G 2730/03; F16F 13/007; F16F 9/02; F16F 9/12; F16F 3/04; F16F 2222/126; F16F 2232/02
  See application file for complete search history.

(56) References Cited

U.S. PATENT DOCUMENTS

| | | |
|---|---|---|
| 5,571,255 A | 11/1996 | Baginski et al. |
| 6,444,934 B1 | 9/2002 | Imura et al. |
| 6,667,452 B2 | 12/2003 | Spiegel |
| 2006/0191756 A1 | 8/2006 | Moradian |
| 2008/0142320 A1 | 6/2008 | Moradian |
| 2015/0155111 A1* | 6/2015 | Kondrus .............. H05K 5/0017 200/43.13 |
| 2018/0130619 A1* | 5/2018 | Neese .................... H01H 19/14 |
| 2019/0228934 A1* | 7/2019 | Aoki ........................ H01H 9/04 |

OTHER PUBLICATIONS

European Search Report Application No. EP 16 15 5837.4 Completed: Jul. 19, 2016; dated Jul. 28, 2016 5 pages.
International Search Report and Written Opinion of the International Searching Authority Application No. PCT/EP2017/051098 Completed: Mar. 2, 2017; dated Mar. 17, 2017 14 pages.

* cited by examiner

SPRING OPERATED ACTUATOR FOR AN ELECTRIC APPARATUS

TECHNICAL FIELD

The present invention relates to a spring operated actuator for an electric switching apparatus including an actuation spring to provide an actuating movement of the switching apparatus and a rotary air damper connected to the actuating spring, which damper has components that are rotatable relative to each other, and which damper is arranged to decelerate the actuating movement during at least an end portion of the actuating movement, the damper having a toroidal working chamber with internal walls formed by two circumferential housing parts, which are rotatable relative to each other and are meeting each other such that a first gap and a second gap are formed between the housing parts, which sealing means overbridges the respective gap and includes a first circumferential seal at the first gap and a second circumferential seal at the second gap. According to a second aspect of the invention it relates to a switching apparatus.

BACKGROUND

In a power transmission or distribution network, switching apparatuses are incorporated into the network to provide automatic protection in response to ab-normal load conditions or to permit opening or closing (switching) of sections of the network. The switching apparatus may therefore be called upon to perform a number of different operations such as interruption of terminal faults or short line faults, interruption of small inductive currents, interruption of capacitive currents, out-of-phase switching or no-load switching, all of which operations are well known to a person skilled in the art.

In switching apparatuses the actual opening or closing operation is carried out by two contacts where normally one is stationary and the other is mobile. The mobile contact is operated by an operating device which comprises an actuator and a mechanism, where said mechanism operatively connects the actuator to the mobile contact.

Actuators of known operating devices for medium and high voltage switches and circuit breakers are of the spring operated, the hydraulic or the electro-magnetic type. In the following, operating devices will be described operating a circuit breaker but similar known operating devices may also operate switches.

A spring operated actuator or spring drive unit as it is also called, generally uses two springs for operating the circuit breaker; an opening spring for opening the circuit breaker and a closing spring for closing the circuit breaker and re-loading the opening spring. Instead of just one spring for each one of the opening spring and the closing spring, sometimes a set of springs may be used for each one of the opening spring and the closing spring. For example, such a set of springs may include a small spring arranged inside a larger spring or two springs arranged in parallel, side by side. In the following, it should be understood that when reference is made to the spring of the respective opening spring and the closing spring, such a spring could include a set of springs. Another mechanism converts the motion of the springs into a translation movement of the mobile contact. In its closed position in a network the mobile contact and the stationary contact of the circuit breaker are in contact with each other and the opening spring and the closing spring of the operating device are charged. Upon an opening command, the opening spring opens the circuit breaker, separating the contacts. Upon a closing command the closing spring closes the circuit breaker and, at the same time, charges the opening spring. The opening spring is now ready to perform a second opening operation if necessary. When the closing spring has closed the circuit breaker, the electrical motor in the operating device recharges the closing spring. This recharging operation takes several seconds.

Illustrative examples of spring operated actuators for a circuit breaker can be found e.g. in U.S. Pat. Nos. 4,678,877, 5,280,258, 5,571,255, 6,444,934 and 6,667,452.

At actuation of the switching apparatus, the moving contact part thereof is brought to a very high speed in order to break the current as fast as possible. At the end part of the movement it is important to decelerate the movement to avoid impact shocks. Therefore actuators of the kind in question normally are equipped with some kind of dampers to slow down the speed of the moving contact at the end of its movement. One damper is provided for the opening and one for the closing. Normally the dampers are linear with a piston operating in a hydraulic cylinder.

Such a damper is space-consuming and requires a plurality of components to be connected to the drive mechanism of the actuator.

In order to overcome such drawbacks and to provide a damper for the closing that requires small space and few components, EP 2317530 suggests using a rotary air damper for damping the closing. The device according to this disclosure thereby is more reliable and precise.

Although the operation of the device according to EP 2317530 has been shown to operate more reliably and precise than traditional devices of this kind, it has been found that the leakage occurring is not predictable, which leads to a damping performance that is not fully controlled.

With the term "end" related to a helical torsion spring is in this application meant the end of the spring material, i.e. the end in the direction of the spring he-lix. For the ends in the axial direction the term "axial end" is used.

The object of the present invention is to improve a device of the kind disclosed in EP 2317530 in order to overcome the drawback related thereto.

SUMMARY

This object of the invention is achieved by a spring operated actuator, in which at least one of the first and second sealing includes a body fitted in a groove formed in the internal walls of at least one of the two housing parts at a location where they meet each other, which body has a sealing surface facing the working chamber, which sealing surface has an extension in the direction perpendicular to the circumferential direction and to the tangential direction that is larger than the maximal gap between the housing parts and which sealing surface is substantially aligned with the wall surface.

Terms like "circumferential", "radial" etc. in this application refer to the rotational axis of the rotary air damper and the aligned axis of the spring if not explicitly expressed otherwise. "Inner" and "outer" refer to the radial direction. "Lateral" is defined by a direction parallel to the rotational axis.

By "substantially aligned" is to be understood that the sealing surface is within a range of +/−0.5 mm from absolute alignment. Preferably, after assembly of the rotary air damper, the sealing surface is in alignment with the adjacent wall surface. However, due to manufacturing tolerances and the fact that the gap g may expand in operation, there may be some misalignment between the sealing surface and the wall surface.

With a seal arrangement according to EP 2317530, air in the damper will leak out into the gap between the two housing halves when being compressed. This air will pass outside the outer periphery of the displacement body and/or the end wall to the low pressure side. This affects the resistance of the compressed air against the rotational movement of the displacement body and thereby the damping operation, which will be less controlled, in particular since the width of the gap may vary during the operation and thereby the leakage there through. By the seal according to the invention, the air in the damper when being compressed cannot leak out into the gap between the housing parts where the seal is located. This is because the width of the seal is larger than the maximum gap. The seal is squeezed to maintain its position due to the air pressure acting on the sealing surface. The remaining leakage that occurs around the edges of the rotatable components is more well-defined and easy to tune appropriately. The resistance from the air against the rotation will therefore be better controlled and consequently also the damping operation. Since the damping operation is more accurate, the actuating spring may be larger and stronger allowing application of the actuator for switching apparatuses at higher voltages.

Preferably both the first and the second seals are designed accordingly. Thereby the above mentioned advantage will be more accentuated than if only one of them have the specified features, although even in the latter case there will be an improvement in relation to prior art.

According to a preferred embodiment of the invention, the actuation spring is an opening spring and the actuating movement is a closing movement.

Although the invented actuator may be employed also for an opening spring, the application to the closing spring is of highest importance.

According to a further preferred embodiment, the groove is formed in both the internal walls.

This arrangement in most cases results in a more effective sealing, and the resulting symmetry provides a more reliable performance in comparison with the possibility that the groove is formed only in one of the internal walls. The latter alternative may, however, under certain conditions be preferred, since the sealing may be simple and arranged at low cost.

According to a further preferred embodiment, the extension of the sealing surface is a plurality of times larger than said maximal gap.

This provides a substantial margin for a proper functioning of the seal and also increases the sealing efficiency.

According to a further preferred embodiment, the sealing body has a rear surface at the side thereof that is opposite to the sealing surface, which rear surface has lateral portions, which meet the lateral ends of the sealing surface at an acute angle.

The inclined rear surfaces results in that there will be a distinct relation between the relative lateral movements that will occur between the housing parts during operation of the damper. Thereby the performance of the seal is within control.

According to a further preferred embodiment, the angle is in the range of 10-50°.

Such shape of the rear surface results in an appropriate relation between the lateral movements of the housing parts and the radial movement of the body. For e.g. an angle of 30°, an increase of the gap with 0.2 mm results in a radial movement of the body into the groove with less than 0.1 mm. Preferably, the angle is within the range of 25-33°.

According to a further preferred embodiment, each lateral portion of the rear surface is planar at least adjacent the point where it meets said lateral ends as seen in a section perpendicular to the circumferential direction.

The planar surface facilitates to obtain a secure support of the body in the groove.

According to a further preferred embodiment, the groove abuts the rear surface at least at the parts thereof that are located adjacent said lateral ends and has a shape corresponding to the lateral portions of the rear surface in the abutting regions.

When the groove is shaped to comply with the shape of the lateral portions of the rear surface, the support of the sealing body in the groove will be robust and assure a proper functioning of the seal.

According to a further preferred embodiment, the sealing body includes a radially inner portion having the shape of a trapezoid in a plane perpendicular to the circumferential direction.

This shape of the sealing body facilitates to obtain appropriate sealing surface and rear surface. Preferably the shape of the sealing body is symmetrical with respect to a central radial plane through the gap.

According to a further preferred embodiment, the sealing body is provided with a retainer means arranged to retain the sealing body in the groove.

The retainer means prevents the seal from the risk of falling inwards into the working chamber.

According to a further preferred embodiment, the retainer means includes a projection extending from the rear surface of the sealing body, which projection has an outer portion that is wider in the axial direction than the width of the projection portion more close to the sealing body.

Thereby the retainer is figured in a simple and reliable way. Preferably the retainer is symmetrically arranged.

According to a further preferred embodiment, each housing part has a circumferential recess on its surface facing the other housing part, which recesses face each other and are located and shaped to accommodate said wider portion such that it is retained in the grooves.

These cooperating recesses provide an efficient holder for the retainer. Preferably the recesses are symmetrically arranged.

According to a further preferred embodiment, the working chamber is formed by an outer wall, an inner wall and first and second side walls and the housing parts meet each other along the outer wall and the inner wall.

The housing of the working chamber is thus radially divided such that the gaps are radial. This means that the small relative movements between the housing parts occur in the axial direction, which from a constructional point of view is a simple solution that facilitates journaling and assures a proper maintenance of the sealing function at changing gap width. Preferably the gaps are located in radial planes that are offset from each other. One of the gapes may e.g. be located in or adjacent the central radial plane and the other one in a radial plane more laterally located.

According to a further preferred embodiment, the components that are rotatable relative to each includes an end wall component attached to the first of said housing parts and a displacement component attached to the second of said housing parts, and which components both have an outer profile of a shape corresponding to the shape of the working chamber as seen in a plane perpendicular to the circumferential direction, and at least one of the components is resilient along at least the part of its profile that is cooperating with one of said first and second seals.

The resiliency provides an adaption to the various radial positions of the seals depending on the momentary width of the gap such that air leakage from the high pressure side to the low pressure side is better controlled.

According to a further preferred embodiment, at least one of said components has at least one orifice providing communication between circumferentially opposite sides of the component.

The retardation of the moving component at the end portion of the stroke is dependent on the air leakage from the high pressure side to the low pressure side. Leakage occurs across the edges of the components. With this embodiment there will also be air leakage through the orifice(s). This fraction of the leakage is easier to calculate and control. This embodiment therefore provides better control of the damping performance in comparison with if all leakage would occur around the edges of the components. This effect is more accentuated the larger the fraction of the total leakage that occurs through the orifice(s) is.

According to the second aspect of the invention, the object is met in that an electrical switching apparatus includes a spring actuator according to the present invention, in particular according to any of the preferred embodiments thereof.

The invented electrical switching apparatus have similar advantages as those of the invented actuator and the preferred embodiments thereof, which advantages have been described above.

According to a preferred embodiment of the electrical switching apparatus, it is a circuit breaker.

This is an application, where the advantages of the present invention are particularly useful.

The above described preferred embodiments of the invention are set out in the dependent claims. It is to be understood that further preferred embodiments may be constituted by any possible combination of features of the described preferred embodiments and by any possible combination of features in these with features described in the description of examples below.

DETAILED DESCRIPTION

As initially mentioned, the present invention is an improvement of the device disclosed in EP 2317530 and is closely related thereto. The complete disclosure of EP 2317530 therefor is explicitly incorporated into this application.

The actuator illustrated in FIG. 1-9 is according to this incorporated disclosure. The description below related to these figures provides the context for a better understanding of the present invention. The description of the prior art relating to FIGS. 1-9 therefore is to be seen as a part of the description of the present invention. Thus features disclosed in these figures and the accompanying description are parts of the description of the present invention, and may serve as a source for claim amendments in the same way as the rest of the present specification.

Figure 9:
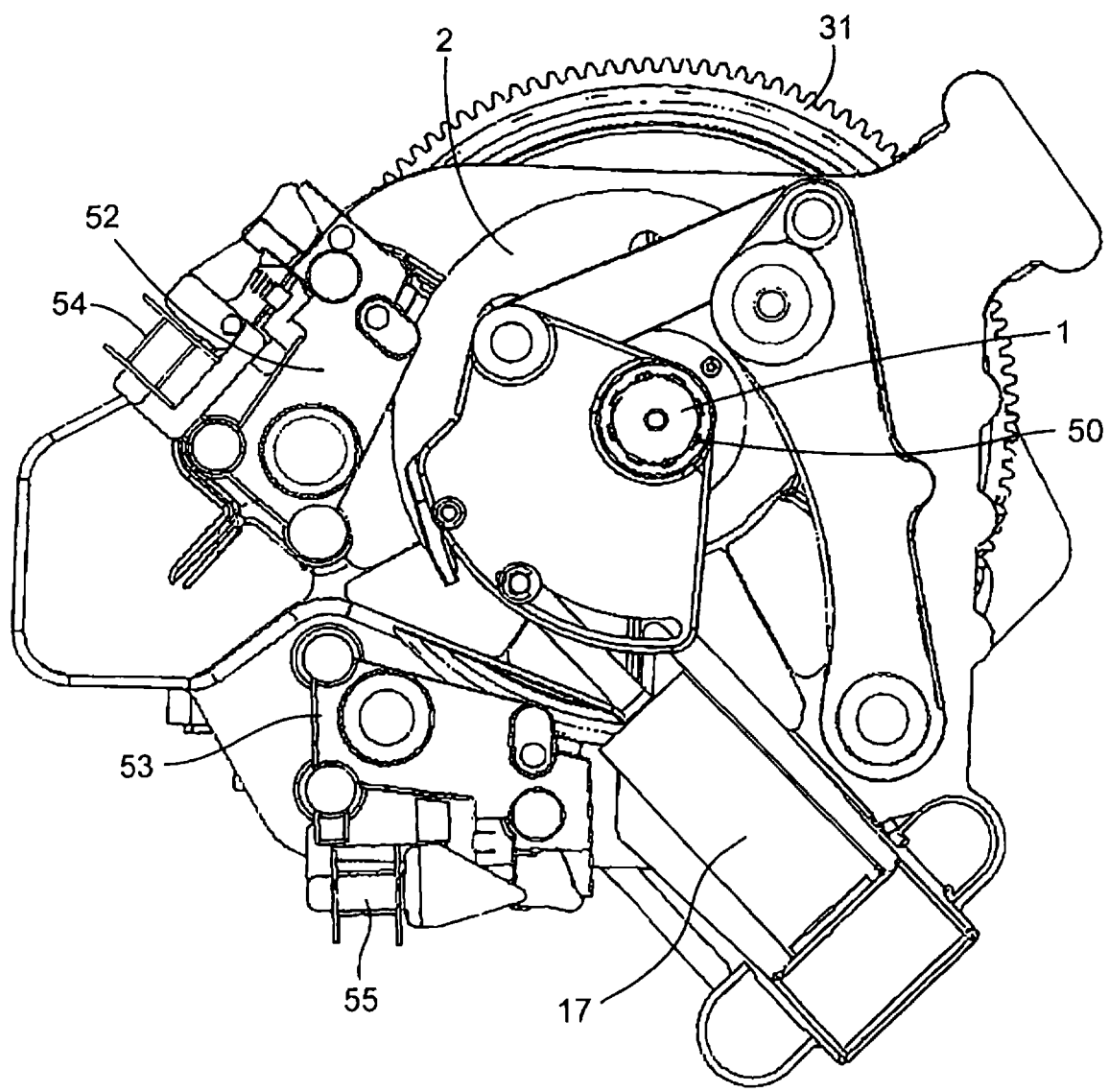
FIG. 9 is an end view of the spring operated actuator as seen from the left of FIG. 1.
Figure 10:
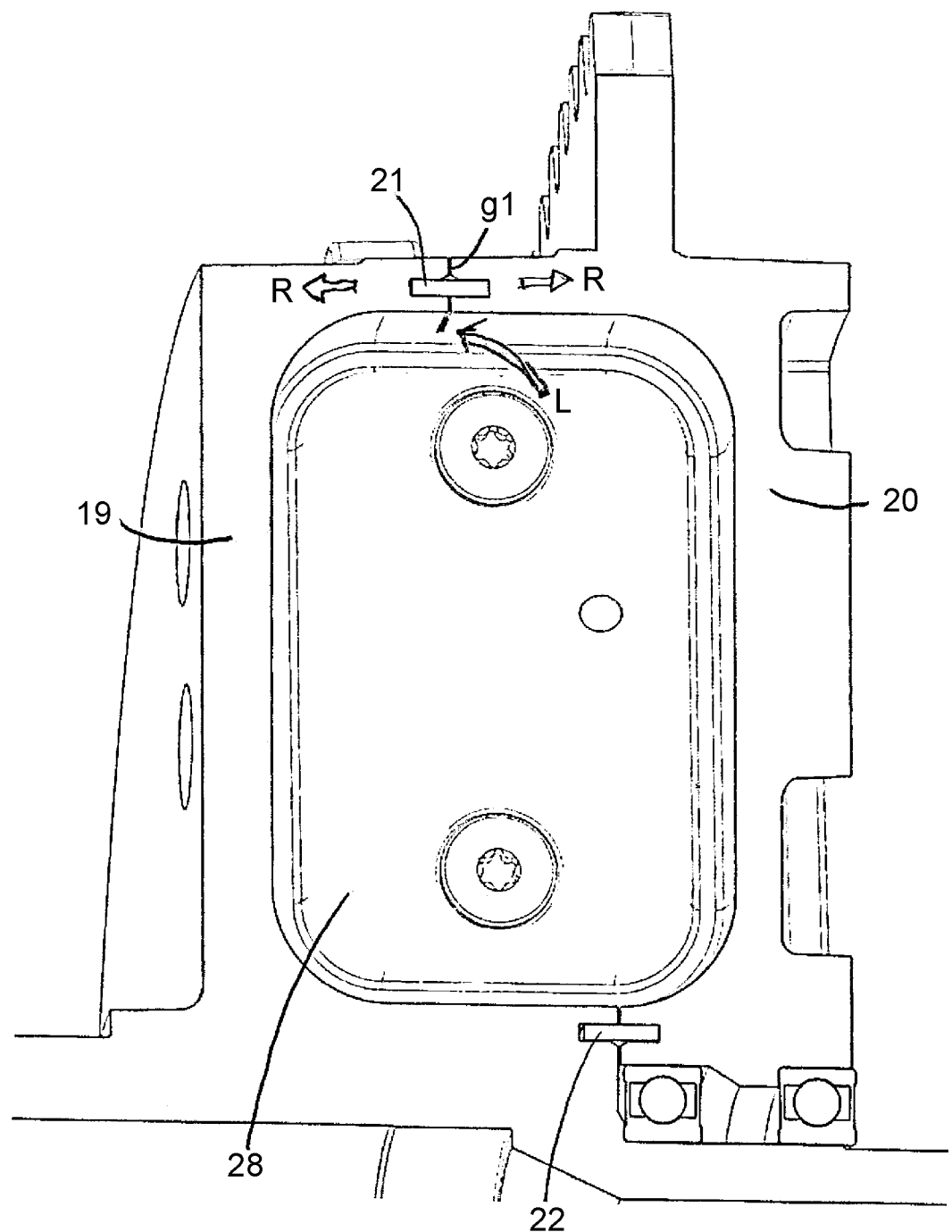
FIGS. 10 and 11 illustrate a problem related to prior art.
Figure 11:
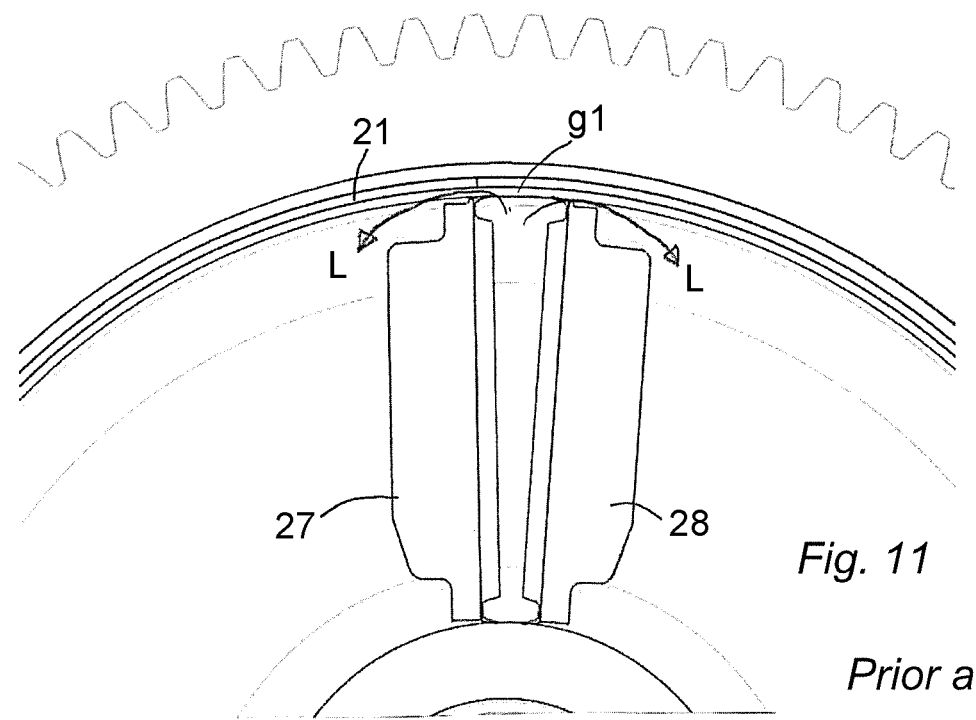

The description of FIGS. 10-11 relates to a detail in the prior art that deviates from and is incompatible with the present invention, and is present in order to illustrate the problem solved by the present invention. The description of example therefore is divided into a first part related to FIGS. 1-9 and describes what is common to the present invention and prior art. The first part also includes the description of FIGS. 10 and 11. The first part is headed "Prior art". The particulars that are specific to the present invention are described further below under the heading "Specifics for the invention".

PRIOR ART

Figure 1:
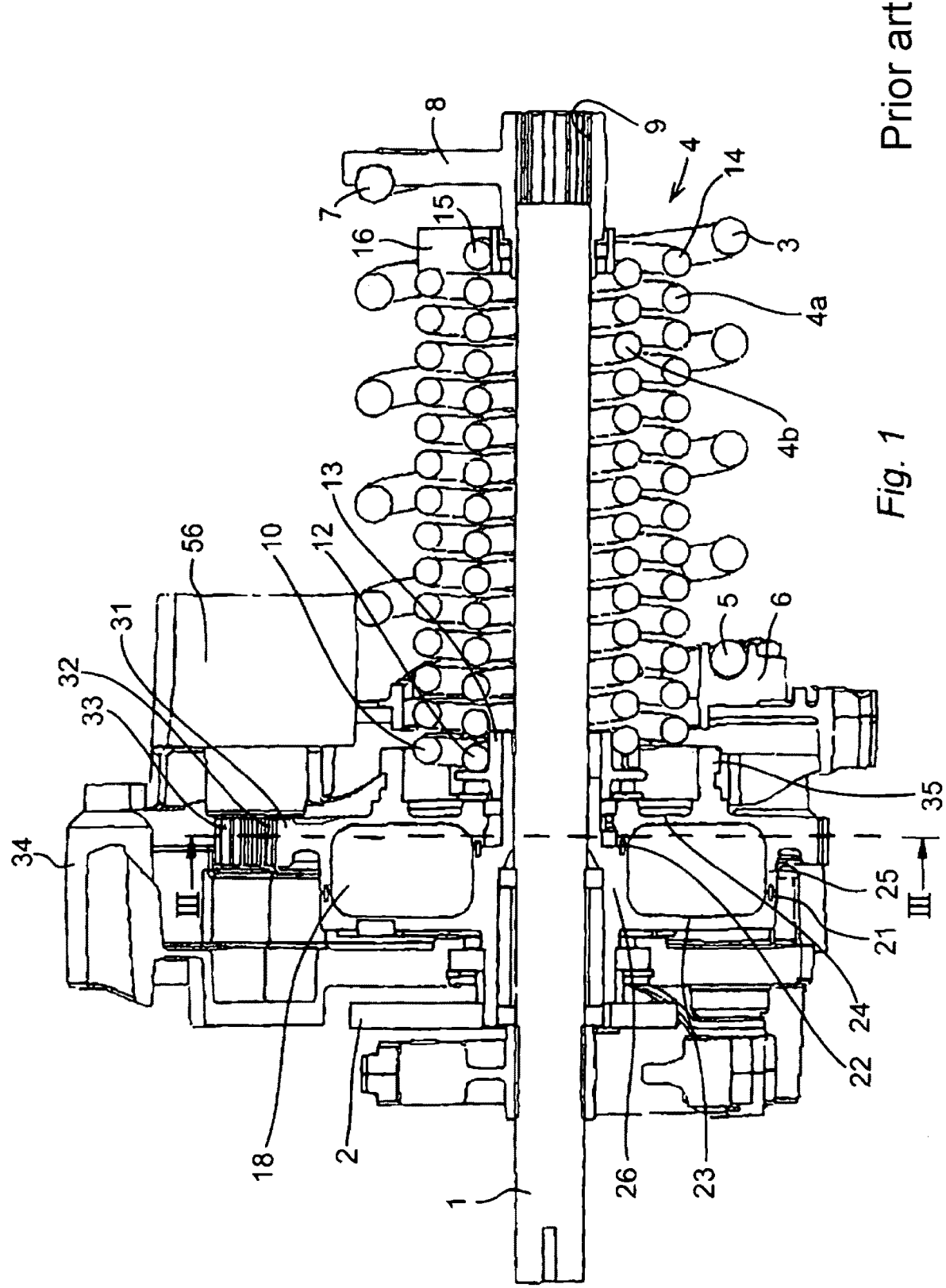
FIG. 1 is an axial section through an example of a spring operated actuator according to prior art.
Figure 2:
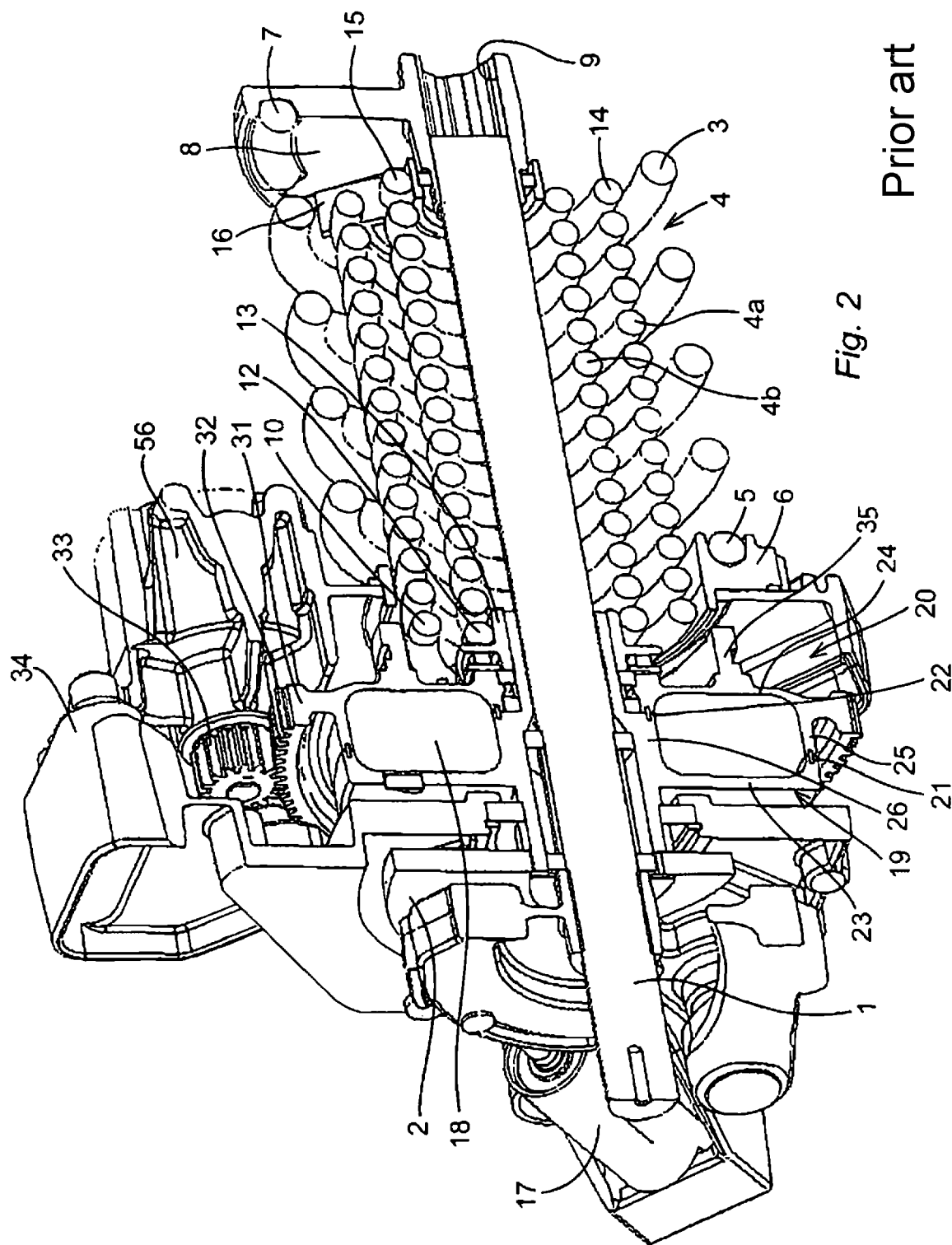
FIG. 2 is a perspective view of the section of FIG. 1.

FIG. 1 is an axial section through the actuator of a circuit breaker. The actuator has a main shaft 1 and a cam disc 2. The cam disc acts on the transmission rod (not shown) for switching the circuit breaker. The transmission from the cam disc to the circuit breaker and the circuit breaker as such can be of a conventional kind and need no further explanation.

The main shaft is operated by an opening spring 3 and a closing spring 4. Both the springs are helical torsion springs and are coaxial with the main shaft. The opening spring 3 is located radially outside the closing spring 4 and thus has an internal diameter exceeding the external diameter of the closing spring 4.

The opening spring 3 is squeezed between two end fittings, a supporting end fitting 6 at the supported end 5 of the spring and an actuating end fitting 8 at its actuating end 7. The opening spring 3 thus in its charged state is loaded in the direction of its helix, or otherwise expressed the charged opening spring is pressed in its unwinding direction. As a consequence the actuating end 7 is acting with a pushing force on the actuating end fitting 8, which is connected through splines 9 to the main shaft 1.

The closing spring 4 consists of two units, a radially outer unit 4a and a radially inner unit 4b, which both have axes aligned with the axis of the opening spring 3 and with the main shaft 1.

Like the opening spring also the closing spring 4 in its charged state is loaded in the direction of its helix. The outer unit 4a of the closing spring has a supported end 10 and a connection end 14, and the inner part has an actuating end 12 and a connection end 15. The supported end 10 is pressed against a supporting end fitting (not shown) which is mounted on a support flange 35, and the actuating end 12 is pressed against an actuating end fitting 13. The connection ends 14, 15 of the two units 4a, 4b are both pressed against a connection fitting 16, through which the two units are in force transmitting relation to each other.

When the circuit breaker is triggered for an opening action the opening spring 3 pushes its actuation end fitting 8 to rotate and thereby rotate the main shaft 1.

Some 0.3 seconds later the circuit breaker is to be closed. The closing spring 4 thereby is activated such that the actuating end 12 thereof pushes its actuating end fitting 13 to, through a series of cooperating components such as the cam, roller, etc., rotate the main shaft 1 in a direction opposite to that of the opening process to move the actuation rod, thereby closing the circuit breaker. When the main shaft 1 rotates in this direction it will also rotate the actuating end fitting 8 of the opening spring 3 in the same direction such that it pushes the actuating end 7 of the opening spring 3 and the opening spring becomes recharged and prepared for a consecutive opening movement should that be required.

When the closing operation is finished the closing spring is recharged in that its supported end 10 is pushed by its supporting end fitting.

At the ends of the opening and closing movements the movements have to be damped in order to avoid impact shocks at the end of the strokes due to ex-cess of energy.

The opening movement is damped by a conventional linearly acting hydraulic damper 17.

The closing movement is damped by a rotary damper 18 having air as working medium. The rotary damper 18 may have components that are rotatable relative to each other. The rotary damper 18 has a toroidal working chamber that is coaxial with the main shaft 1. The working chamber is formed by a housing having a first side wall 24, a second side wall 23, an outer circumferential wall 25 and an inner circumferential wall 26. The housing is spitted into two parts, a first part 20 and a second part 19. The two parts are rotatable relative to each other and are connected by an outer circumferential seal 21 and an inner circumferential seal 22.

The second part 19 is drivingly connected to the actuating end fitting 13 of the inner unit 4b of the closing spring 4 and thus rotates together with the cam disc 2 at closing. The first part 20 on its outside has an axially extending flange 35 on which the supporting end fitting of the outer unit 4a of the closing spring 4 is mounted.

Figure 3:
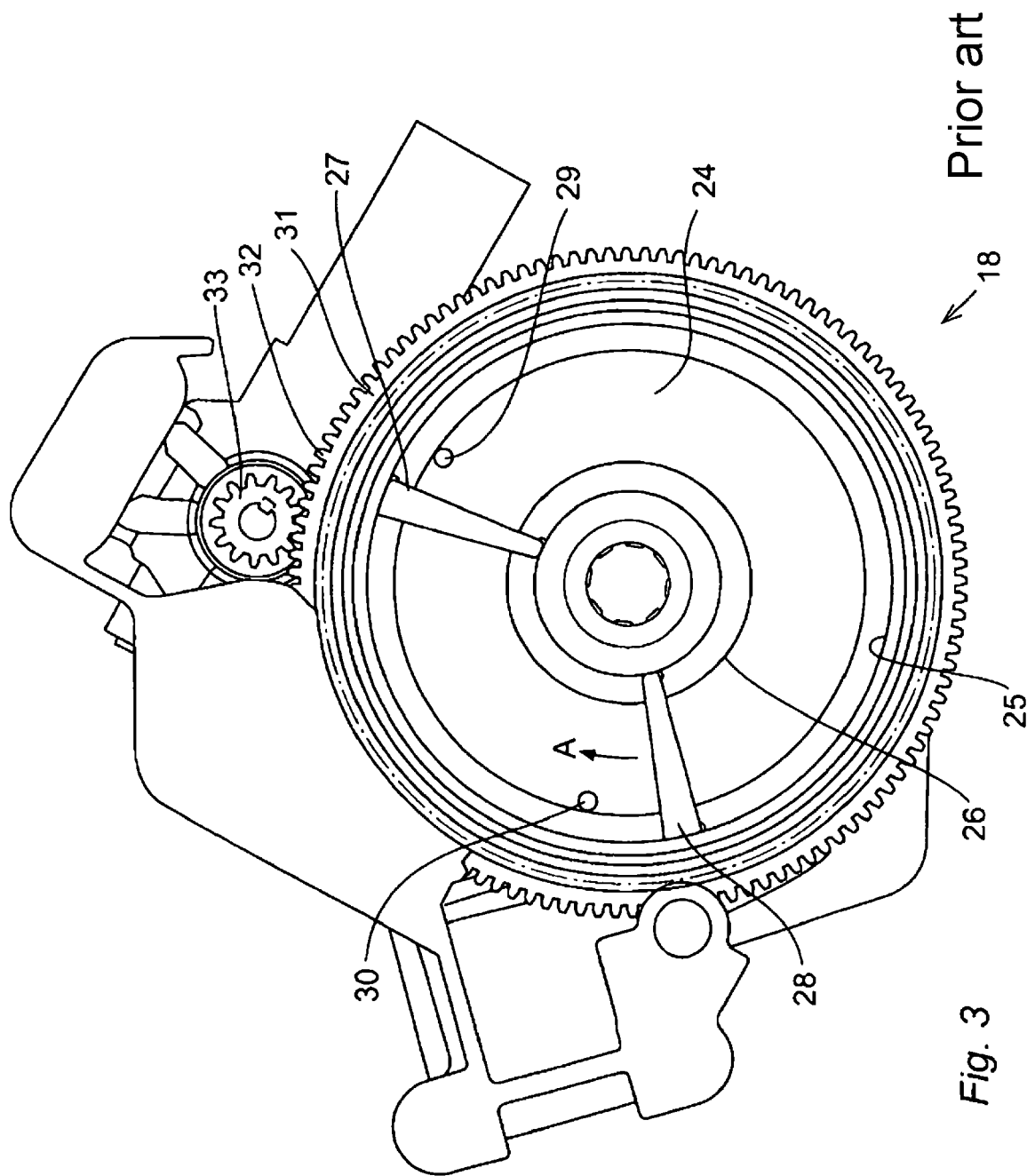
FIG. 3 is a section along line III-III in FIG. 1.

The operation of the closing damper is explained with reference to FIG. 3 which is a radial section through the damper in the direction towards the first part 20. During the closing movement the first part 20 is stationary and the second part 19 (not visible in FIG. 3) is rotating in direction of arrow A, defined as the rotational direction of the damper.

A disc-like body is attached to the first side wall 24, which forms a radial end wall 27. A corresponding disc-like body is attached to the second side wall 23 and forms a displacement body 28. Each of the end wall 27 and the displacement body 28 are sealingly cooperating with the side walls 23, 24 and the circumferential walls 25, 26 of the working chamber.

The first side wall has a first 29 and second 30 orifice there through to act as inlet and outlet respectively for air.

The inlet orifice 29 is located short after the end wall 27 as seen in the rotational direction of the damper. The outlet orifice 30 is located about a right angle ahead of the end wall 27.

When the closing spring is charged and in condition for initiating a closing movement the displacement body 28 is located closed to the end wall 27 on its right side as seen in the figure, i.e. in the area of the inlet orifice 29. The second part 19 of the housing is, via a series of components, drivingly connected with the main shaft.

When a closing movement occurs the displacement body 28 will move from its initial position adjacent the end wall 27 since it is connected to the second side wall 23, and rotate in the direction of arrow A until it has made an almost complete turn and reaches the left side of the end wall 27. During its rotation air will be sucked in through the inlet orifice 29. And during the major part of the turn air will be pressed out through the outlet orifice 30.

After the displacement body has passed the outlet orifice 30 air will be trapped between the displacement body 28 and the end wall 27. Further rotation will compress the trapped air. Thereby an increasing counterforce against the rotation develops and some air leakage will occur along the sealing lines between the end wall 27 and the walls of the housing and between the displacement body 28 and the walls. Thereby the damping effect is achieved.

Normally the air leakage around the end wall and the displacement body is sufficient to attain a damping that is properly balanced between overdamping and underdamping. In case the seals are very effective a proper air leakage can be attained by providing a small leakage hole through the end wall 27 or through the displacement body 28.

Figure 4:
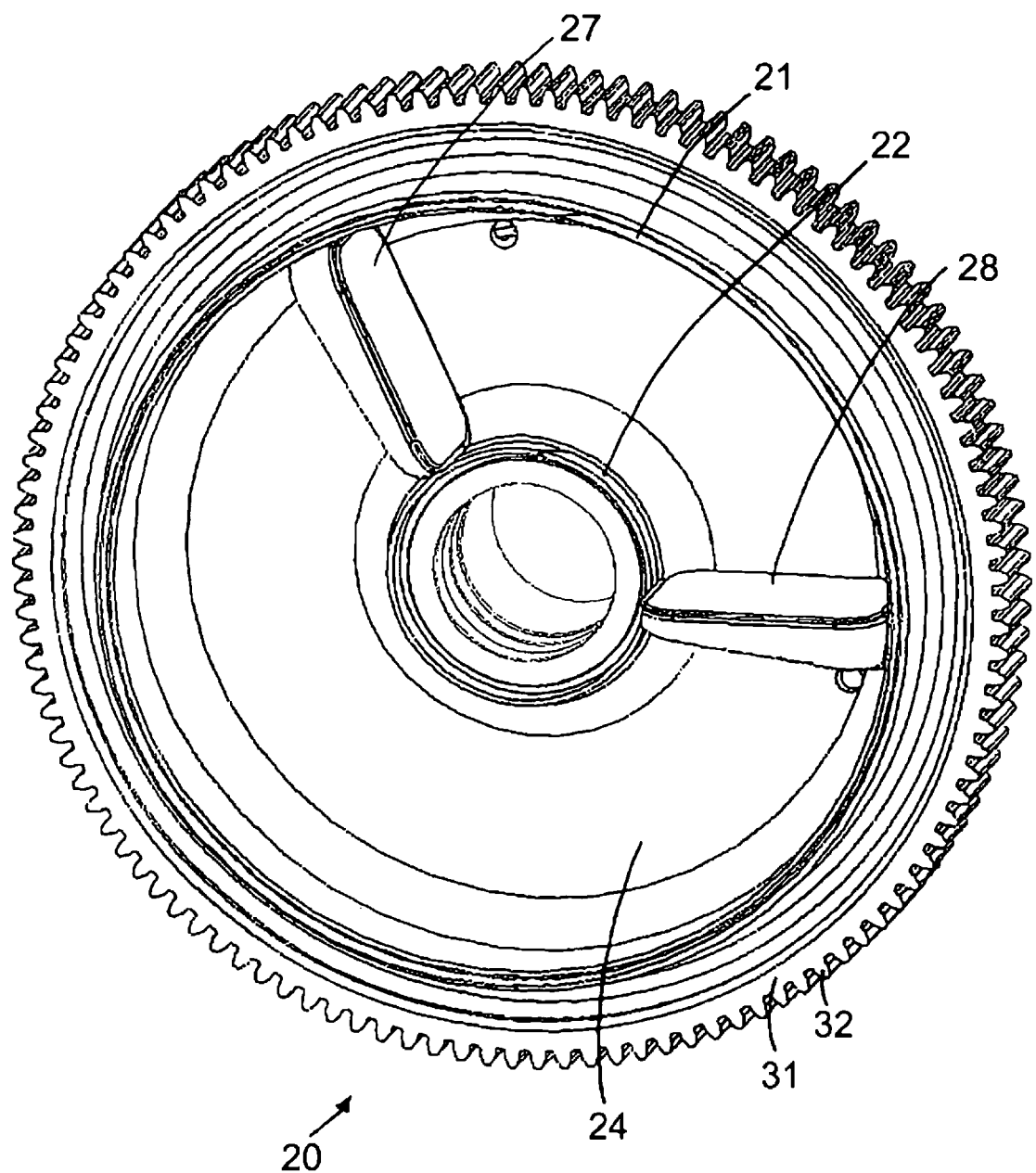
FIG. 4 is a perspective view of a detail of FIG. 3.

FIG. 4 is a perspective view of the first part of the housing of the closing damper.

The mechanism for charging the closing spring 4 is partly integrated with the closing damper 18. The first part 20 of the damper is externally shaped as a gear wheel 31 with external radially projecting teeth 32. The gear wheel 31 cooperates with a pinion 33 driven by an electric motor via a gear box 56. At charging, the pinion 33 drives the first part 20 of the damper 18 in the direction of arrow A (FIG. 3) about one complete turn. The end wall 27 thereby moves to a position immediately to the left of the displacement body 28. The end wall 27 and the displacement body thus will reach a position relative to each other as described above when the closing movement starts.

The first part 20 of the damper 18 is through the flange 35 (FIGS. 1 and 2) drivingly connected to the supporting end fitting 11 of the outer unit 4a of the closing spring 4.

When the first part 20 rotates, the supporting end fitting of the outer unit 4a of the closing spring will follow its rotation since it is mounted on the axial flange 35 extending rearwards from the first part 20 of the damper 18. Thereby the closing spring is helically loaded to its charged state.

Figure 5:
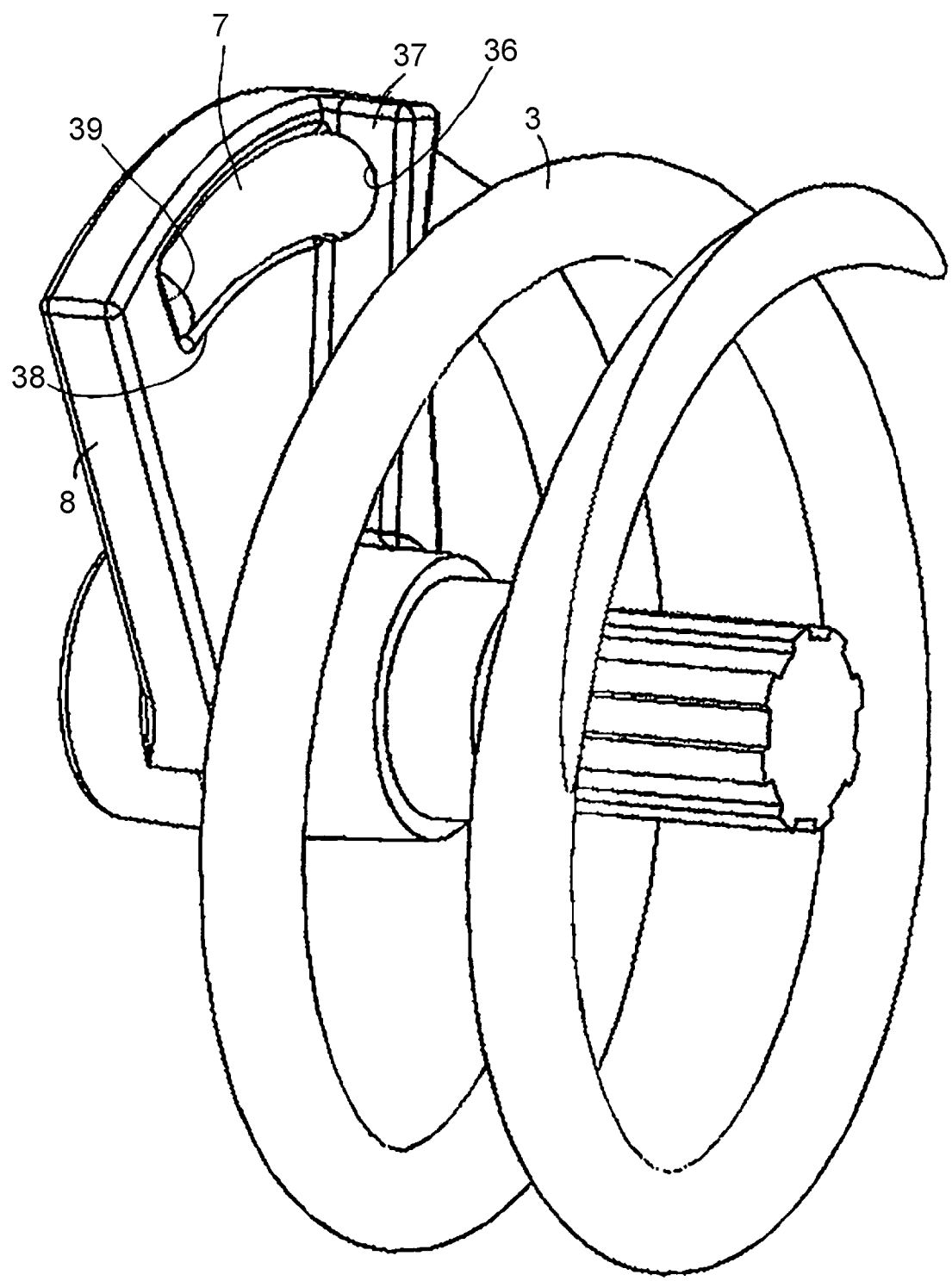
FIG. 5 is a perspective view of a detail of the spring operated actuator of FIG. 1-4.

FIG. 5 is a perspective view of the end fitting 8 of the opening spring 3 as seen from the spring towards the end fitting. The actuating end 7 of the opening spring 3 extends through a hole 36 in a flange 37 forming a part of the end fitting 8. A depression 38 in the end fitting 8 guides the actuating end 7 against an abutment surface 39. The other end fittings may have a similar construction.

Figure 6:
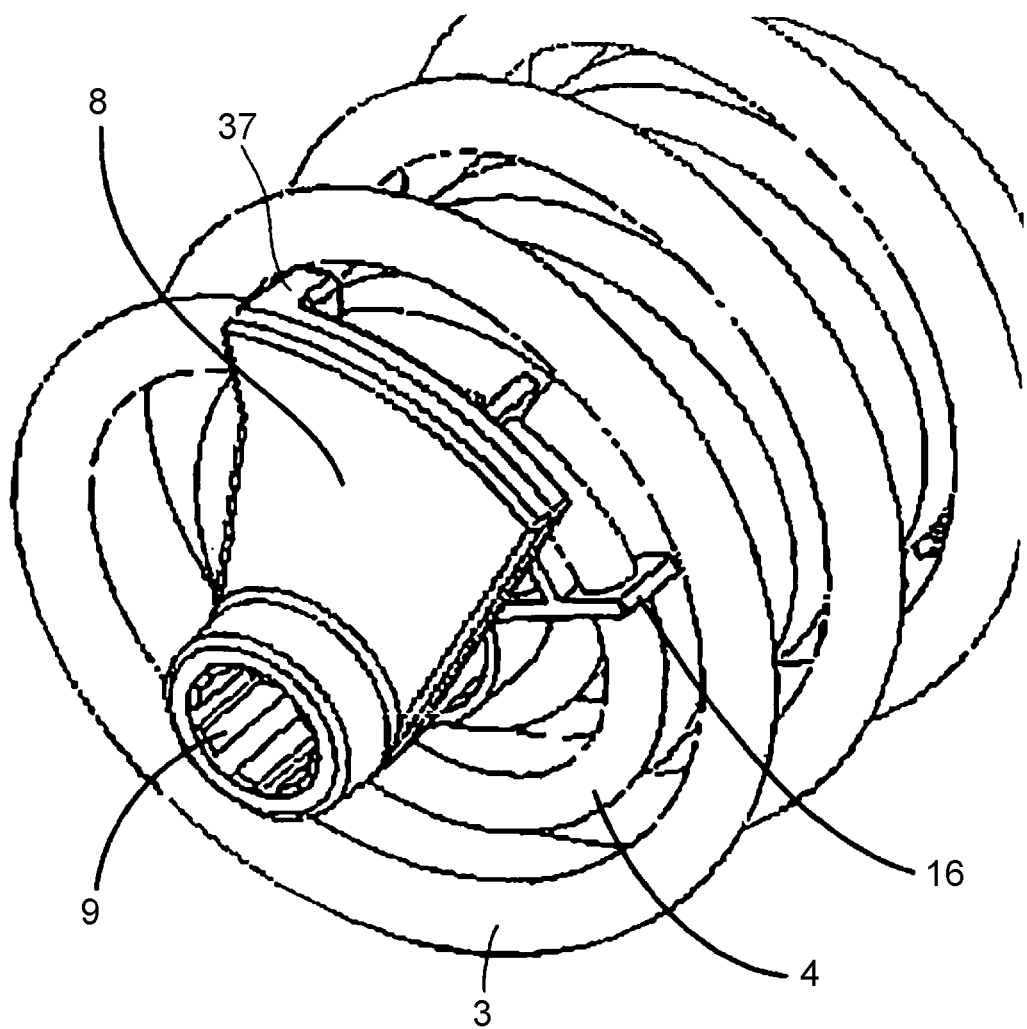
FIG. 6 is a perspective view of the detail in FIG. 5 from another direction.

FIG. 6 illustrates the actuating end fitting 8 of the opening spring 3 from another direction. Also the connection end fitting 16 of the units 4a and 4b is partly visible there behind.

Figure 7:
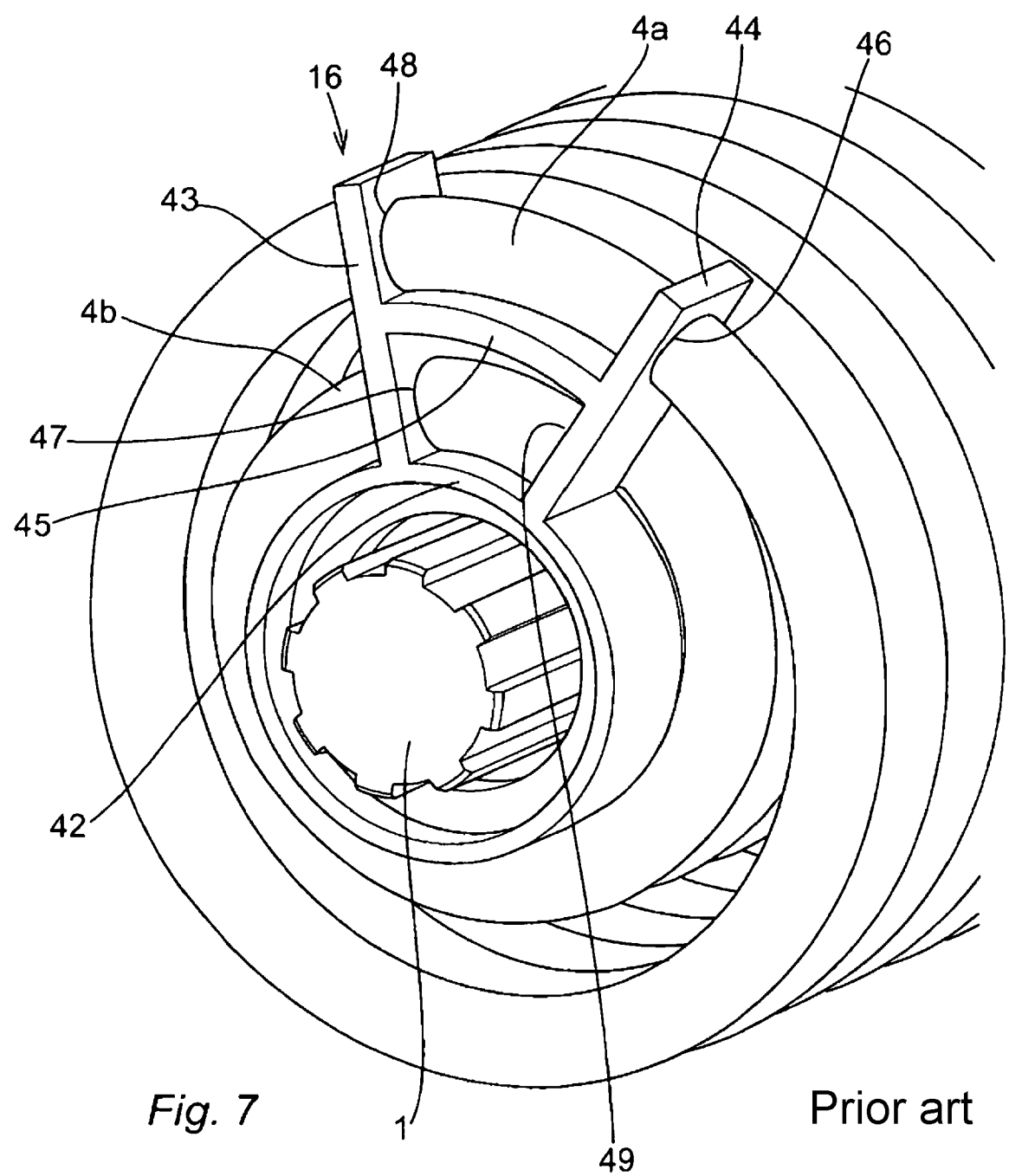
FIG. 7 is a perspective view of a further detail of the spring operated actuator of FIG. 1-6.

FIG. 7 illustrates the connection end fitting 16 more in detail. It consists of an inner ring 42 from which a first 43 and a second 44 abutment flange extend radially outwards at an angular position relative to each other of about 45-60°. At the radial middle of the abutment flanges 43, 44 a circular wall 45 interconnects them, which circular wall is coaxial with the inner ring 42. The first abutment flange 43 has an abutment surface 48 at its radially outer part and a hole 47 through its inner part. Correspondingly the second abutment flange 44 has a hole 46 through its outer part and an abutment surface 49 on its inner part.

The inner closing spring unit 4b extends through the hole 47 of the first flange 43, and its end abuts the abutment surface 49 of the second flange 44. Correspondingly the outer closing spring unit 4a extends through the hole 46 of the second flange 44, and its end abuts the abutment surface 48 of the first flange 43. A pushing force from the outer closing spring unit 4a thereby is transmitted to the inner closing spring unit 4b. The end portions of the closing spring units 4a, 4b are guided against its respective abutment surface 48, 49 by the holes 46, 47, the ring 42 and the circular wall 45. The end portions thereby can be loosely fitted into the connection end fitting 8 and no further attachment means is required.

Figure 8:
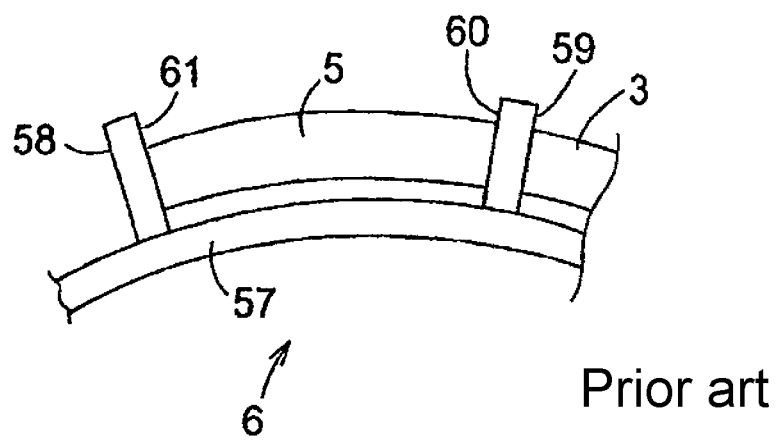
FIG. 8 is a side view of a part of a detail of FIG. 1-4 according to an alternative example.

An alternative construction of the end fittings is illustrated in FIG. 8. In FIG. 8 a part of the supporting end fitting 6 for the opening spring 3 is schematically illustrated. The supported end portion 5 of the opening spring 3 has an end surface against an abutment surface 61 on a radial flange 58 of the end fitting 6. A holding device is formed by a second radial flange 59 and a circumferential part 57 connecting the two flanges 58, 59. The second radial flange 59 has a hole 60 there through and the opening spring extends through this hole 60 such that its end portion 5 is directed towards the abutment surface 61. The other end fittings may have a similar construction.

FIG. 9 is an end view of the spring operated actuator as seen from the left in FIG. 1. The cam disc 2 is drivingly connected to the main shaft 1 through splines 50. Latch mechanisms 52, 53 with a respective trigging coil 54, 55 control the opening and closing movements of the actuator. In the left part of the figure the oil damper 17 for the opening spring is visible, and to the left a part of the gear wheel 31 for charging the closing spring can be seen.

FIG. 10 is a section through the working chamber in a perspective view according to the prior art and is used to illustrate a problem entailing that construction. The rotating housing part 19 and the stationary housing part 20 meet each other along the outer and inner walls such that a respective gap is formed between the housing parts 19, 20. The gap in the outer wall is indicated as $g_1$ and is overbridged by a seal 21 inserted in recesses in the housing parts 19, 20. The seal 21 prevents air from leaking out from the working chamber. However, the compressed air is allowed to flow into the gap up to the seal 21 and pass through the gap in the circumferential direction to the other side of the displacement body 28 as indicated by the arrow L. This means that air leaks from the high pressure side to the low pressure side. Similar air leakage occurs across the gap at the inner seal 22.

The pressure within the working chamber develops a separating force R between the two housing parts 19, 20. This force varies in response to the varying pressure within the working chamber during a damping operation. Therefore the width of the gap $g_1$ will vary and consequently also the air leakage L across the edge of the displacement body 28. This air leakage affects the damping operation. Since the momentary width of the gap is hard to predict and varies, it is difficult to control the damping operation to be adequate avoiding underdamping as well as overdamping.

FIG. 11 illustrates the above described leakage in a radial plane.

SPECIFICS OF THE INVENTION

Figure 12:
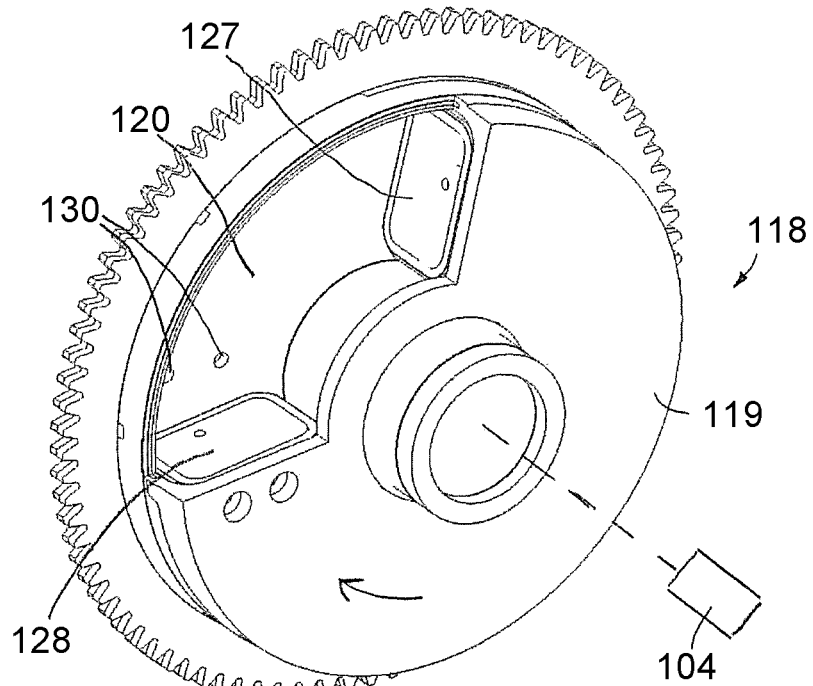
FIG. 12 is a perspective view of a rotary air damper according to a first example of the present invention.

FIG. 12 is a perspective view of the rotary air damper 118 according to the present invention, which rotary air damper 118 is mechanically connected to a closing spring 104, schematically indicated in the figure. The closing spring may be of the kind described above in relation to FIGS. 1 and 2. The rotating housing part 119 rotates in the direction of the arrow and has a displacement body 128 attached thereto. A part of the rotating housing part 119 is left away from the figure for illustrative clarity. The stationary housing part 120 has an end wall 127 attached thereto.

The figure illustrates the position at the end of the closing stroke of a breaker. During the closing stroke the compressed air is discharged through the outlets 130. Shortly after the displacement body 128 has passed the outlets 130, the air will be trapped and compressed between the displacement body 128 and the stationary end wall 127. The pressure developed in the closed chamber decelerates the rotation and thereby dampens the movement at the end of the stroke.

Figure 13:
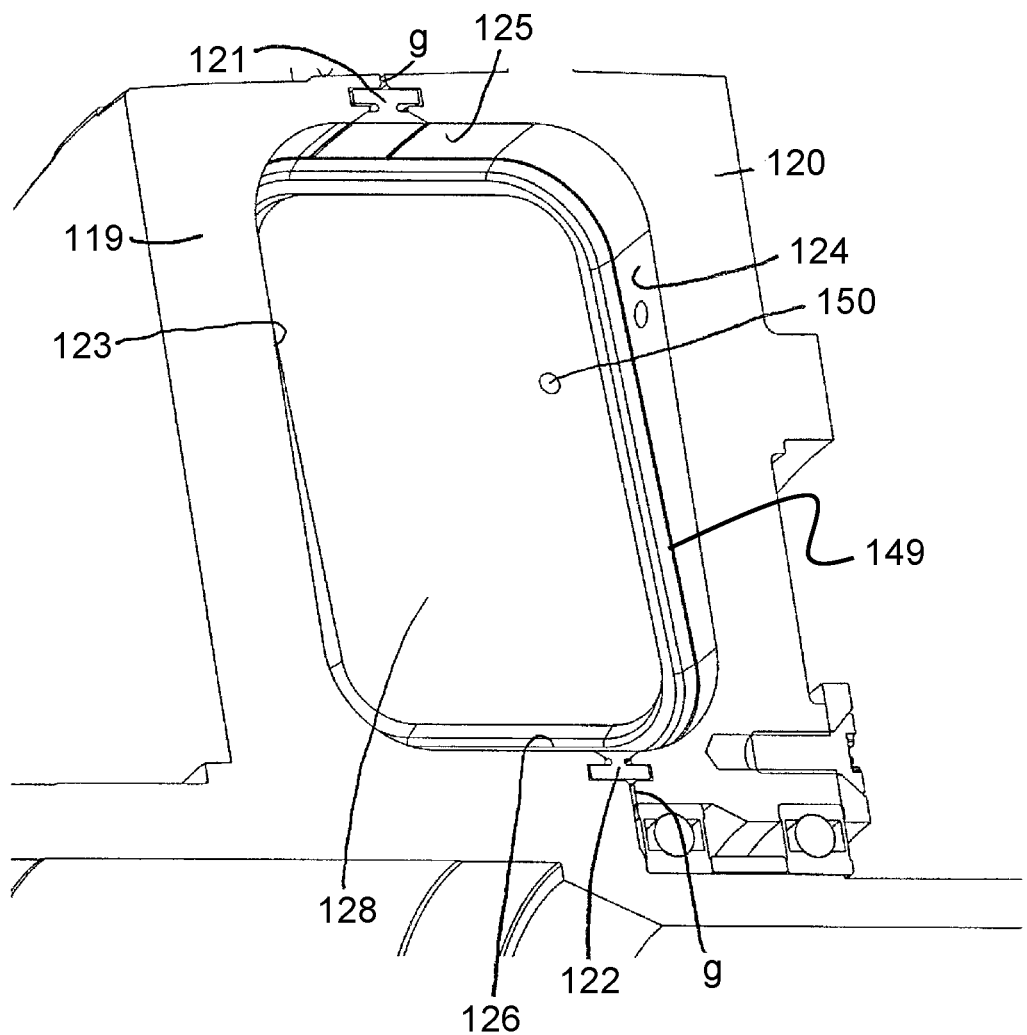
FIG. 13 is a section through the working chamber in perspective of the damper of FIG. 12.

FIG. 13 in a section similar to the one of FIG. 10 illustrates the present invention. The device of FIG. 13 is distinguished from the one illustrated in FIG. 10 mainly in the arrangement of the seals in the gaps, but may in all other aspects be similar to the device of FIG. 10.

The rotary air damper of FIG. 13 thus has a rotating circumferential housing part 119 and a stationary circumferential housing part 120, which together form the toroidal working chamber in which the displacement body 128 rotates during a damping stroke. The working chamber is limited by a first side wall 124, a second side wall 123, an outer wall 125 and an inner wall 126. The displacement body is attached to the rotating housing part 119 and thus rotates together therewith. An end wall (not visible in the figure) is attached to the stationary housing part 120.

The two housing parts 119, 120 meet each other along an outer circumferential gap g and an inner circumferential gap. A circumferential outer, first seal 121 is arranged at the outer circumferential gap and overbridges the gap. In a similar way a circumferential inner, second seal 122 is arranged at the inner circumferential seal.

Figure 14:
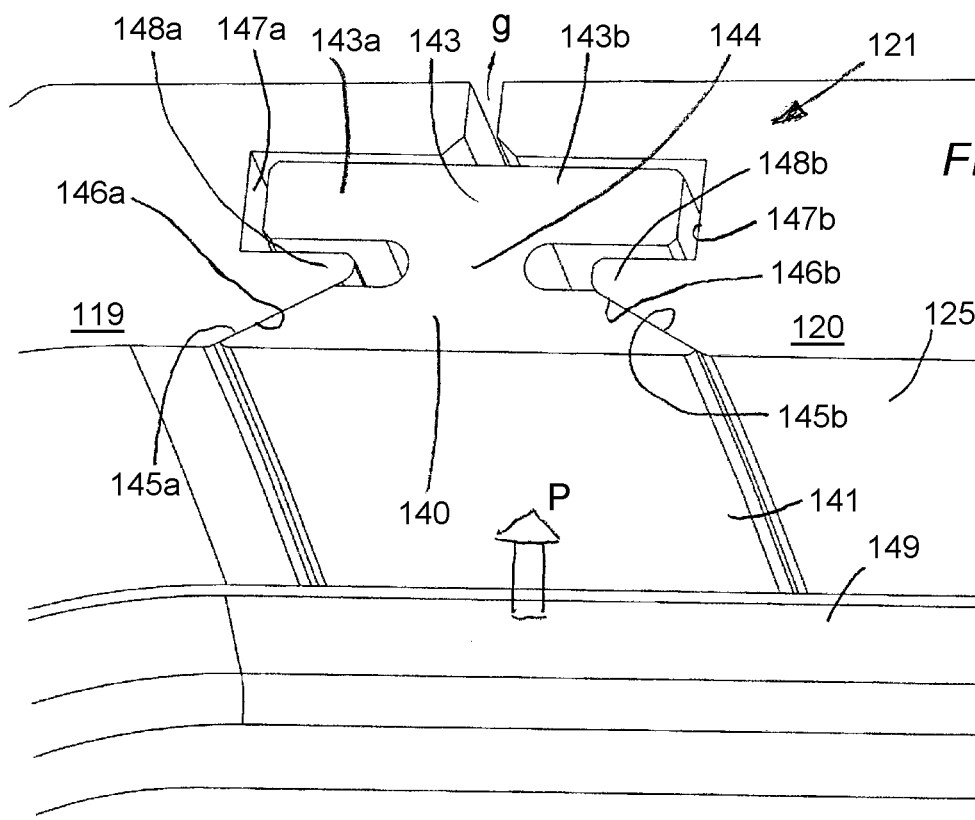
FIG. 14 is an enlargement of a detail of FIG. 13.

FIG. 14 is an enlargement of a detail of FIG. 13 and illustrates the outer, first seal 121 and the gap g in which the seal acts. The inner, second seal 122 is correspondingly arranged. The outer, first seal 121 consists of a sealing body 140 and a retainer 143, 143a, 143b, 144 connected to the sealing body 140 by a waist portion 144 of the retainer. The sealing body 140 has the shape of a trapezoid in a section perpendicular to its circumferential extension. Its large end forms a sealing surface 141 and faces the working chamber. The side of the trapezoid opposite to the sealing surface is called the rear surface and includes a central portion parallel to the sealing surface and two tapering lateral portions 145a, 145b connecting the central portion to the sealing surface 141. The tapering lateral portions 145a, 145b meet the sealing surface at an angle of 30°.

The retainer is an integral part of the outer, first seal 121 and has a general T-shape. It has a radially outer part 143, 143a, 143b connected to the sealing body 140 by a waist part 144, which has a smaller axial width than the outer part 143, 143a, 143b.

The gap g between the housing parts 119, 120 has a profile that is adapted to accommodate and retain the outer, first seal 121. The sealing body 140 thus is located in a groove 146a, 146b in the wall. The groove is formed by a cut out in each of the housing parts 119, 120 at the edge where the gap meets the circumferential chamber wall of the respective housing part 119, 120. The groove is laterally formed by a respective tapering surface in the housing parts. The angle of the tapering is equal to the inclination angle of the tapering lateral portions 145a, 145b of the rear surface such that supports for these are formed.

The surfaces of the housing parts 119, 120 facing the gap g have a projection 148a, 148b in the region of the waist part 144. The distance between the projections 148a, 148b is somewhat larger than the width of the waist part 144. Further up in the figure it can be seen that each housing part 119, 120 has a recess 147a, 147b accommodating the outer, wide parts 143a, 143b of the retainer. The recesses 147a, 147b have sufficient dimensions to establish radial and axial clearances against the retainer 143a, 143b.

The displacement body 128 (see FIG. 13) moves in the circumferential direction in the working chamber, i.e. perpendicular to the plane of the figure. It has an edge seal 149 surrounding its periphery. The edge seal 149 is resilient and seals against the internal walls of the working chamber and against the outer, first seal 121 as well as the inner, second seal 122 (see FIG. 13).

In operation of the damper the air in the part of the working chamber that is ahead of the displacement body 128 will be compressed. Compressed air thereby will leak across the seal 149 at the edges of the displacement body 128 to the other side thereof. The pressurized part of the working chamber creates an axial force acting as a separating force between the housing parts 119, 120, which tends to widen the gap g. The separating force will vary during a damping stroke and thus the width of the gap. The pressure in the working chamber acts in the direction of arrow P on the sealing surface 141 of the outer seal 121 so that it is pressed upwards in the figure and thereby is held in contact with the tapering lateral surfaces of the groove 146a, 146b.

If the lateral surfaces in the groove 146a, 146b are moved away from each other from the position of the figure due to increasing separating force, the sealing body 140 will follow that movement and thus move upwards in the figure due to the pressure P acting on its sealing surface 141. The sealing body 140 thus will prevent air to leak up into the gap g, and this is valid also when the width of the gap g changes. With the angle in this example between the lateral tapering surfaces and the sealing surface, 30°, the radial displacement of the sealing body 140 will be roughly 30% of the change in the width of the gap g.

The T-shaped retainer 143, 143a, 143b, 144 eliminates the risk that the outer seal 121 will fall into the working chamber. The wider radial dimension of the recesses 147a, 147b than the radial dimensions of the lateral parts 143a, 143b of the retainer allows adaption to the radial displacements of the outer, first seal 121.

The resiliency of the edge seal 149 allows it to follow the sealing surface 141 when it is displaced radially such that the sealing between these is maintained.

The sealing between the stationary end wall 127 (see FIG. 12) is similar to that described above for the displacement body 128. Also the sealing between the inner seal 122 (see FIG. 13) and the displacement body 128 and the end wall 127 may be correspondingly performed.

Since there is no leakage through the gap g from the pressure side to the other side of the working chamber, the only leakage occurring is around a part of the periphery of the displacement body 128 and the end wall 127.

In some applications it might be desirable to control the leakage between the pressure side and the other side by providing an orifice 150 (see FIG. 13) extending across the displacement body 128 such that both sides communicate with each other. Thereby the damping performance will be determined by the total leakage around the displacement body and through the orifice. Such orifice may alternatively or complementary be present also in the end wall 127. Of course more than one orifice may be present in the displacement body.

Figure 16:
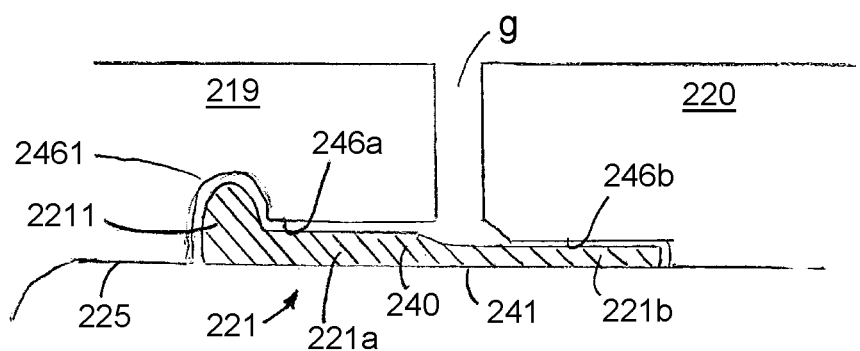
FIG. 16 is a section similar to that of FIG. 14 illustrating a second example.

FIG. 16 schematically illustrates a second example of the invention. It is a section through the outer, first seal 221 of the damper in a section corresponding to that of FIG. 14. The seal is housed in a groove 246a, 246b formed in the housing parts 219, 220 where they meet each other at the gap g. A first part 246b of the groove located in housing part 220 is relatively shallow and the second part 246a of the groove, located in the housing part 219 is deeper. The second part 246a at its laterally outer end has a depressed portion 2461.

The seal 221 has a cross section adapted to fit in the groove 246a, 246b and has a sealing surface 241 facing the working chamber. The sealing surface 241 is aligned with the internal walls of the housing parts 219, 220. The seal 221 thus has a thinner portion 221b adapted to fit in the shallow, first groove part 246b and a thicker portion 221a adapted to fit in the deeper, second groove part 246a. The two portions 221a, 221b together constitute a sealing body 240. The thicker portion 221a at its laterally outer end has a projection 2211 that fits into the depressed portion 2461. The projection 2211 in the depressed portion 2461, function as a retainer means and contributes to maintain the seal 221 in proper position.

Figure 17:
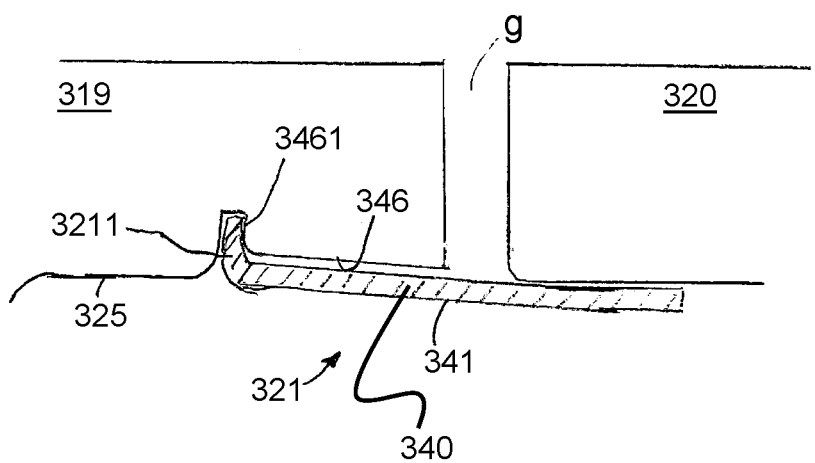
FIG. 17 is a section similar to that of FIG. 14 illustrating a third example.

A third example of the design of the first seal is schematically illustrated in FIG. 17, which is a section similar to that of FIG. 14. In this example the outer, first seal 321 is located in a groove 346 that is formed solely in one housing part. The groove 346 has a depressed portion 3461. The seal 321 has substantially uniform thickness and has a folded laterally outer portion 3211 extending into the depressed portion 3461 of the groove 346. The folded portion 3211 acts as a retainer means that keeps the seal 321 maintained in position. The unfolded part of the seal 321 constitutes a sealing body 340.

Alternatively, the seal may have a decreasing thickness from the folded laterally outer portion 3211 towards the other lateral end of the seal 321. In a further alternative there may also be a shallow groove part in the housing part 320.

Figure 15:
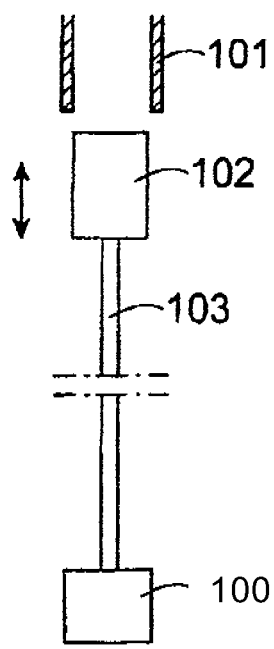
FIG. 15 schematically illustrates a circuit breaker according to the invention.

FIG. 15 schematically illustrates a circuit breaker where the movable con-tact part 102 is brought into and out of contact with the stationary contact part 101 by a rod 103 actuated by a spring operated actuator 100 according to the present invention. For a three phase breaker the actuator 100 can be arranged to simultaneously move the movable contact part 102 of each phase.

It might be worth mentioning that "toroidal" not implies that the cross section of the working chamber perpendicular to the circumferential direction need be circular, but may have any shape. In the examples shown herein, said cross section is rectangular with rounded corners. Other conceivable cross sectional shapes include circular, elliptical, or any other smooth shape.

The invention claimed is:

1. A spring operated actuator for an electric switching apparatus comprising:
   an actuation spring to provide an actuating movement of the switching apparatus and a rotary air damper connected to the actuation spring, said rotary air damper having components that are rotatable relative to each other;
   wherein said rotary air damper is arranged to decelerate the actuating movement during at least an end portion of the actuating movement, and said rotary air damper has a toroidal working chamber with internal walls formed by two circumferential housing parts;

wherein said housing parts are rotatable relative to each other and meet each other such that a first gap and a second gap are formed between said housing parts;

wherein a seal means is formed between said housing parts, said seal means includes a first circumferential seal that overbridges the first gap and a second circumferential seal that overbridges the second gap;

wherein said first seal, said second seal, or each of said first and second seals includes a sealing body fitted in a groove formed in at least one of the internal walls of the two housing parts at a location where said housing parts meet, said sealing body has a sealing surface facing the toroidal working chamber, said sealing surface has an extension in a direction perpendicular to a circumferential direction of said respective seal and to a radial direction of said respective seal, said extension is larger than a maximal gap between the housing parts, and said sealing surface is substantially aligned with a wall surface of said housing parts.

2. The spring operated actuator according to claim 1, wherein said actuation spring is an opening spring and said actuating movement is a closing movement.

3. The spring operated actuator according to claim 1, wherein said groove is formed in both of the internal walls of the two housing parts.

4. The spring operated actuator according to claim 1, wherein said extension of the sealing surface is a plurality of times larger than said maximal gap.

5. The spring operated actuator according to claim 1, wherein the sealing body has a rear surface at a side that is opposite to the sealing surface, wherein said rear surface includes lateral portions that each meet a lateral end of the sealing surface at an angle of less than 90°.

6. The spring operated actuator according to claim 5, wherein said angle is in the range of 10-50°.

7. The spring operated actuator according to claim 5, wherein each lateral portion is planar adjacent to a point where the lateral portion meets said lateral end as seen in a section perpendicular to the circumferential direction.

8. The spring operated actuator according to claim 5, wherein said groove abuts said lateral portions at least at parts thereof that are located adjacent to said lateral ends and has a shape corresponding to the said lateral portions in abutting regions.

9. The spring operated actuator according to claim 1, wherein the sealing body includes a radially inner portion having a shape of a trapezoid in a plane perpendicular to the circumferential direction.

10. The spring operated actuator according to claim 1, wherein the sealing body is provided with a retainer means arranged to retain the sealing body in the groove.

11. The spring operated actuator according to claim 10, wherein the retainer means includes a projection extending from a rear surface of the sealing body, wherein said projection has an outer portion that is wider in an axial direction than a width of the projection portion that is closer to the sealing body.

12. The spring operated actuator according to claim 11, wherein each housing part has a circumferential recess on a surface facing the other housing part, wherein said recesses are facing each other; and wherein said recesses are located and shaped to accommodate said wider portion such that said wider portion is retained in the recesses.

13. The spring operated actuator according to claim 1, wherein the working chamber is formed by an outer wall, an inner wall, a first side wall, and a second side wall, wherein the housing parts meet each other along the outer wall and the inner wall.

14. The spring operated actuator according to claim 1, wherein the components include an end wall attached to a first of said housing parts and a displacement body attached to a second of said housing parts, wherein said components both have an outer profile of a shape corresponding to the shape of the working chamber as seen in a plane perpendicular to the circumferential direction, and wherein at least one of the components is resilient along at least a part of said outer profile that is cooperating with one of said first and second seals.

15. The spring operated actuator according to claim 14, wherein at least one of said components has at least one orifice providing communication between circumferentially opposite sides of the component.

16. The spring operated actuator according to claim 2, wherein said groove is formed in both of the internal walls of the two housing parts.

17. The spring operated actuator according to claim 6, wherein each lateral portion is planar adjacent to a point where the lateral portion meets said lateral end as seen in a section perpendicular to the circumferential direction.

18. An electrical switching apparatus comprising:

an actuation spring to provide an actuating movement of the switching apparatus and a rotary air damper connected to the actuation spring, said rotary air damper having components that are rotatable relative to each other;

wherein said rotary air damper is arranged to decelerate the actuating movement during at least an end portion of the actuating movement, and said rotary air damper has a toroidal working chamber with internal walls formed by two circumferential housing parts;

wherein said housing parts are rotatable relative to each other and meet each other such that a first gap and a second gap are formed between said housing parts;

wherein a seal means is formed between said housing parts, said seal means includes a first circumferential seal that overbridges the first gap and a second circumferential seal that overbridges the second gap;

wherein said first seal, said second seals, or each of said first and second seals includes a sealing body fitted in a groove formed in at least one of the internal walls of the two housing parts at a location where said housing parts meet, said sealing body has a sealing surface facing the toroidal working chamber, said sealing surface has an extension in a direction perpendicular to a circumferential direction of said respective seal and to a radial direction of said respective seal, said extension is larger than a maximal gap between the housing parts, and said sealing surface is substantially aligned with a wall surface of said housing parts.

19. The electrical switching apparatus according to claim 18, wherein the switching apparatus is a circuit breaker.

* * * * *